April 16, 1940.　　　V. VALLETTA　　　2,197,163
INDEPENDENT WHEEL SUSPENSION FOR MOTOR VEHICLES
Filed July 7, 1938
Fig. 1
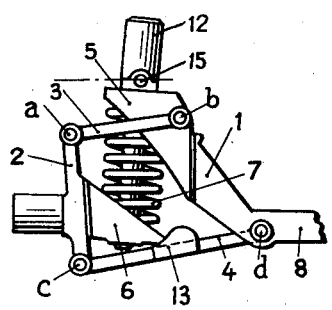
Fig. 2
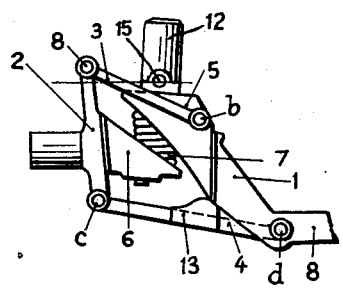
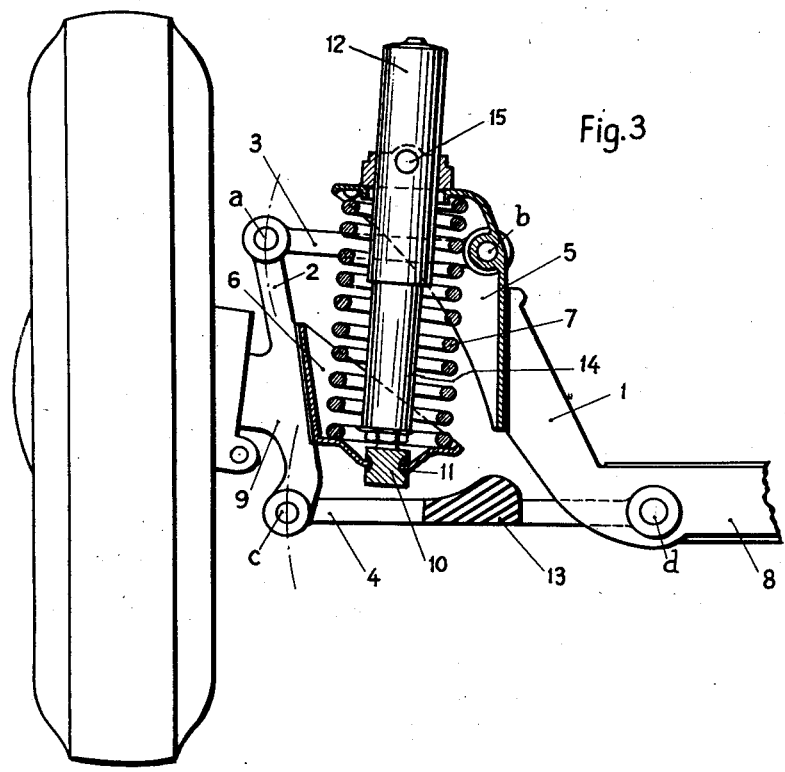
Fig. 3
Inventor
Vittorio Valletta,
By Sommers & Young attys Patented Apr. 16, 1940

2,197,163

UNITED STATES PATENT OFFICE 2,197,163

INDEPENDENT WHEEL SUSPENSION FOR MOTOR VEHICLES

Vittorio Valletta, Turin, Italy, assignor to Fiat Societá Anonima, Turin, Italy

Application July 7, 1938, Serial No. 217,987
In Italy October 22, 1937

1 Claim. (Cl. 267—20)

When, with independent wheel suspnsions for motor vehicles of the known type in which the wheel is connected to the vehicle frame by means of a pair of links, it is desired to dispense with complicated, expensive and clumsy transmission devices, the spring is generally arranged between the lower, longer link and an arm or bracket secured to the frame. In such an arrangement the spring deformations are smaller than the extent of oscillation of the wheel, i. e. the degree of resiliency of the suspension is limited and the arrangement of a hydraulic shock absorber within the spring coil acts as a disturber, because the spring axis is rocked at each oscillation and, on account of the reduced deformation of the spring, the liquid volume displaced cannot be considerable unless the diameter and, consequently, the size and weight of the spring are exaggerated.

In coiled spring suspensions of the so-called "candlestick" type, in which the wheel is connected to the frame by means of a sleeve movable on a fixed vertical spindle, around which the spring is coiled, the above mentioned drawbacks are avoided. The spring deformation is equal to the extent of oscillation of the wheel and the shock absorber may be located within the vertical spindle. However, movement of the sleeve on the spindle is accompanied by considerable friction, the spindle is subjected to heavy stresses when sharp and sudden shocks occur, and the construction of the spindle and sleeve is much more expensive than that of a pair of links.

The present invention provides a motor vehicle suspension of the type embodying a pair of links and a coiled spring, characterized in that the spring is compressed between an arm or bracket attached to the wheel and an arm or bracket attached to the vehicle frame. With this arrangement, the spring deformation is practically equal to the extent of oscillation of the wheel and the spring is always substantially vertical as in a "candlestick" suspension, so that the advantages of the "candlestick" suspension are thus combined with those of the link quadrilateral type while the drawbacks of both types are eliminated. A hydraulic piston shock absorber is arranged within the spring coil.

By way of example a constructional embodiment of the invention is shown on the accompanying drawing.

Figs. 1 and 2 represent this embodiment diagrammatically in its two end positions.

Fig. 3 is a sectional view, on a larger scale, of the suspension in an intermediate position and as applied to a steering road wheel.

A link quadrilateral is formed by the arm 1, which is a part of the axle 8 fixed on the vehicle frame, by the wheel support 2 opposite the arm 1, and by upper and lower links 3 and 4 articulated at a, b, c, d, to the arm 1 and support 2, respectively. The upper link 3 is shorter than the lower one, as is usual in order to prevent or limit lateral dragging of the wheel on the ground during oscillations. The arm 1 and wheel support 2 have fixed thereto brackets 5, 6, respectively, the bracket 5 overlying the bracket 6, and a coiled spring 7 is compressed between the two brackets.

With this arrangement, the spring deformations are practically equal to the oscillations of the wheel. The spring axis, as will be evident by comparing Figs. 1 and 2, deviates only slightly from the vertical in passing from the position of minimum to that of maximum compression, so that a hydraulic telescopic or piston shock absorber may be located easily and satisfactorily within the spring.

According to Fig. 3, the wheel support 2 is provided with an arm 9 which carries the king pin for a steering wheel. The lower link 4 carries a pad 13 of rubber or the like serving as a damper in the two end positions taken by the suspension as it is acted upon either by the bracket 6 (Fig. 1) or the arm 1 and bracket 5 (Fig. 2).

A hydraulic telescopic or piston shock absorber is mounted within the coiled spring 7; its lower element 14 is articulated by means of a head 10 and ring 11 of rubber to the bracket 6 and its upper element 12 is articulated to the bracket 5 by means of lateral pivots 15 disposed normally with respect to the shock absorber axis. The points of articulation of the shock absorber are situated very near the end coils of the spring, so that the axes of the spring and shock absorber substantially coincide at any degree of compression of the spring.

The unit is of light and compact construction, so that an axle 8 may be fully equipped with the suspension for the two wheels and then easily and rapidly assembled to the vehicle frame by fitting the connecting bolts through suitable holes provided in the axle 8 and frame members.

What I claim is:

Independent wheel suspension for motor vehicles, comprising a pair of links articulated to the vehicle frame, a wheel support member articulated to the ends of said links and connecting them together, a bracket on the wheel support, a bracket fixed to the vehicle frame, and a resilient pad arranged on the lower link to act as a damper against the bracket on the wheel support when the suspension reaches its maximum deformation in one direction and, as a damper against the bracket on the vehicle frame when the suspension reaches its maximum deformation in the other direction.

VITTORIO VALLETTA.